United States Patent [19]
Iwata et al.

[11] Patent Number: 5,942,822
[45] Date of Patent: Aug. 24, 1999

[54] ELECTRIC MOTOR STRUCTURE

[75] Inventors: Masato Iwata, Kiryu; Eiichi Machida, Maebashi, both of Japan

[73] Assignee: Mitsuba Corporation, Kiryu, Japan

[21] Appl. No.: 08/992,482

[22] Filed: Dec. 17, 1997

[30] Foreign Application Priority Data

Dec. 27, 1996 [JP] Japan ..................... 8-357842

[51] Int. Cl.⁶ .............. H02K 11/00; H01R 39/38
[52] U.S. Cl. .............................. 310/71; 310/239
[58] Field of Search ................. 310/71, 89, 91, 310/239

[56] References Cited

U.S. PATENT DOCUMENTS

| | | | |
|---|---|---|---|
| 3,539,855 | 11/1970 | Blume | 310/239 |
| 3,603,824 | 9/1971 | Csaki | 310/71 |
| 4,916,347 | 4/1990 | Pillerel | 310/239 |

FOREIGN PATENT DOCUMENTS 668021  3/1952  United Kingdom ............ 310/71

*Primary Examiner*—Clayton LaBalle
*Attorney, Agent, or Firm*—Oliff & Berridge, PLC

[57] ABSTRACT

An electric motor structure is shown in which a yoke supporting an armature shaft is fixedly secured to a bracket with set bolts passing through the yoke in the axial direction and in which the distances between a pair of brushes and a pair of internal terminals connected thereto are substantially equal to each other. In a base unit, set bolt through holes for allowing the penetration of a pair of set bolts and a pair of brush holders are disposed on diameter lines perpendicular to each other, and further, a pair of internal terminal plates are disposed to straddle the outer circumference of one set bolt. The inserting tip portion of a coupler unit equipped with external terminal plates electrically connected to the internal terminal plates is branched into two sections. When the coupler unit is connected to the internal terminal plates the set bolt is positioned between the branched sections of the coupler unit.

8 Claims, 6 Drawing Sheets

ELECTRIC MOTOR STRUCTURE

BACKGROUND OF THE INVENTION

1. Field of Invention

The present invention relates to an electric motor structure applicable to electrical equipment to be mounted on motor vehicles.

2. Description of Related Art

In general, an electric motor of this kind is equipped with a yoke containing an armature shaft therein and a base unit including a brush holder, and the yoke is designed to be connected to a bracket such as an end bracket by a set bolt which penetrates the base unit in its axial direction. Further, in this type of electric motor, a pair of internal terminals respectively connected to brushes are provided on the base unit, and a coupler with external terminals penetrates into the interior of the yoke from the exterior of the yoke to establish an electrical connection between the interior and the exterior of the yoke.

However, in this case, there is a need to arrange the various components taking into consideration insulation between the set bolt and the respective members placed in the base unit and the mounting of the respective members. For this reason, in a related motor, as shown in FIG. 7, the layout is designed so that the facing line between a pair of set bolts 10e at the positions where the set bolts penetrate the base unit, is substantially perpendicular to a facing line between a pair of brushes at the positions where the brushes are disposed on the base unit, and internal terminal plates 18c mounted on the base unit 17 are placed between the penetration position of the one set bolt 10e and a brush holder 11.

However, in this structure, the facing distances between the brushes 18 and the corresponding internal terminal plates 18c differ from each other, and accordingly, it is necessary to prepare two types of brushes having pigtails 18b different in length. The longer pigtail 18b requires wiring to run over a set bolt 10e, and hence, measures must be taken to electrically insulate the set bolt, so the number of parts increases and the working efficiency deteriorates. The Applicant's invention is intended to solve the aforementioned problems with the prior art.

SUMMARY OF THE INVENTION

In accordance with an embodiment of the Applicant's invention, an electric motor is equipped with a yoke incorporating an armature shaft and a base unit. The base unit supports a brush holder, and the yoke is connected to a bracket by a set bolt that penetrates said base unit in its axial direction. A pair of internal terminals to be respectively connected to brushes are disposed in an opposed relation in the base unit so as to straddle the outer circumference of the set bolt adjacent the position where the bolt penetrates the base unit. A coupler unit is provided with external terminals to be electrically connected to the internal terminals. An inserting tip portion of the coupler unit equipped with the external terminals has a bifurcated branch section for straddling the outer circumference of the set bolt such that the set bolt is positioned between the external terminals.

With this structure, insulation between the set bolt and the internal terminals is achievable and the disposition of the respective parts is excellently balanced.

In this structure, the bifurcated branch section can serve to accomplish insulation between the terminals electrically connected to each other and the set bolt.

In addition, the coupler unit according to this invention can penetrate a coupler through-hole made in the yoke to be incorporated into the base unit.

BRIEF DESCRIPTION OF THE DRAWINGS

The object and features of the present invention will become more readily apparent from the following detailed description of the preferred embodiment taken in conjunction with the accompanying drawings in which.

DETAILED DESCRIPTION OF PREFERRED EMBODIMENTS

Figure 1:
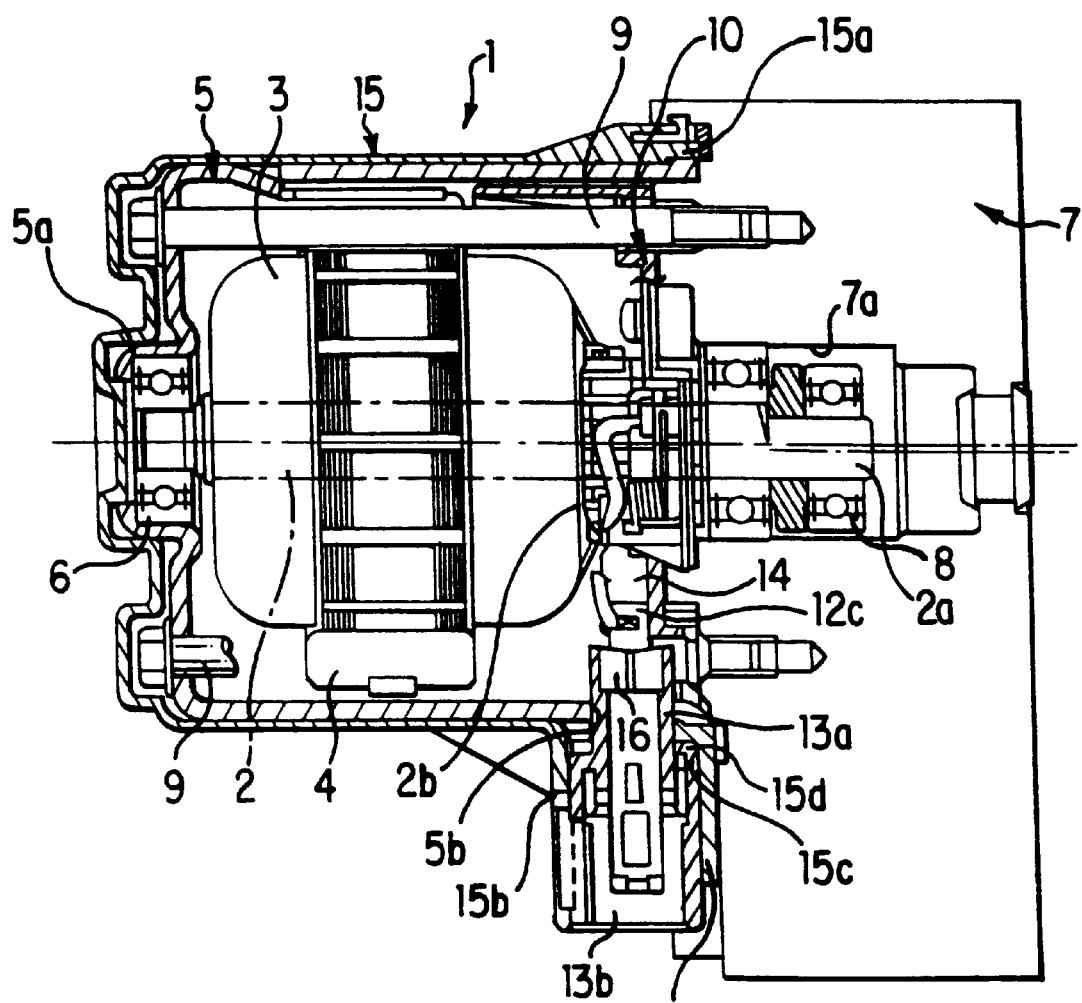
FIG. 1 is a side elevation view partially in cross section showing an electric motor according to an embodiment of the present invention.
Figure 2:
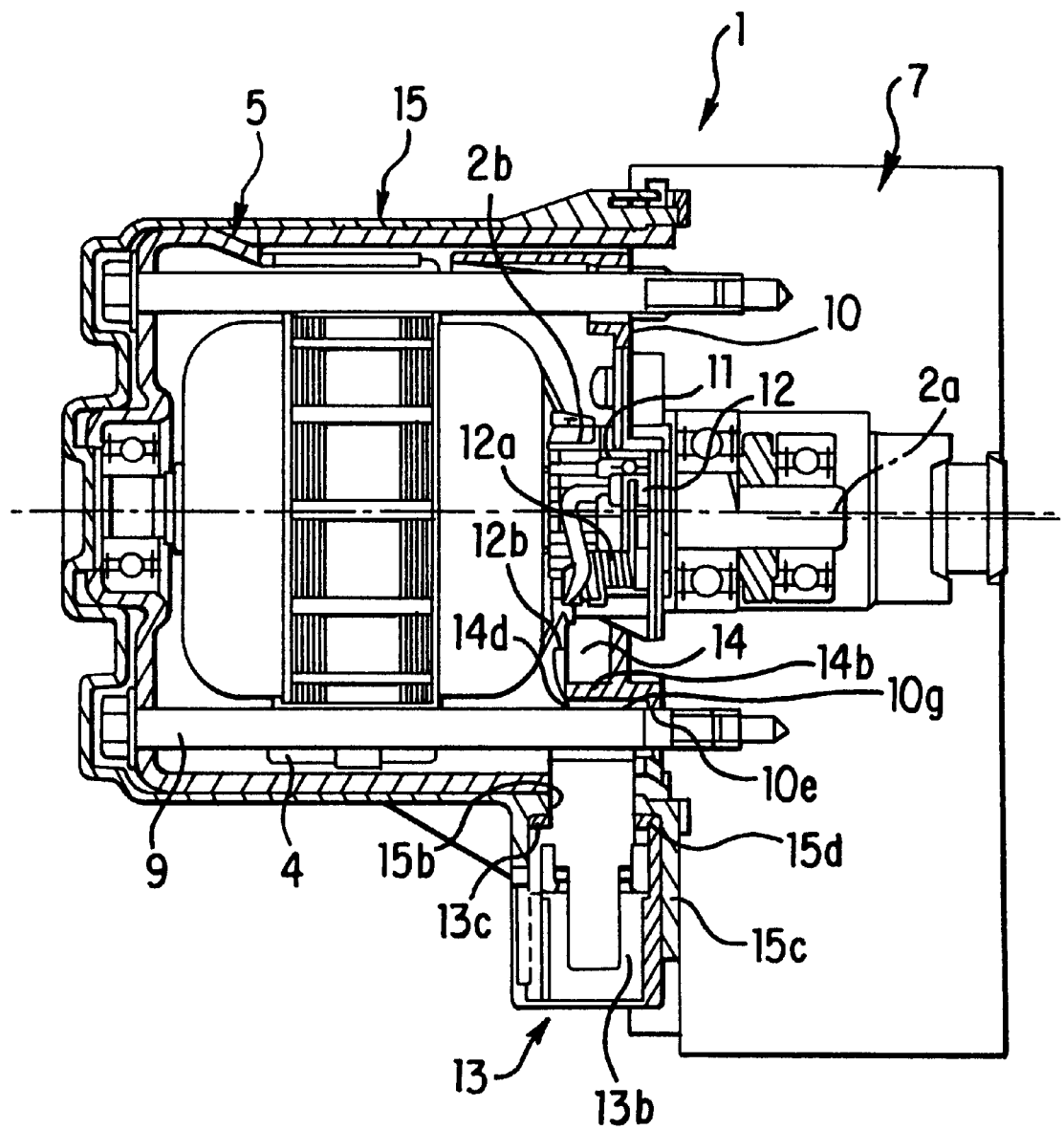
FIG. 2 is a side elevation view partially in cross section showing a portion of the electric motor different from that of FIG. 1.
Figure 3:
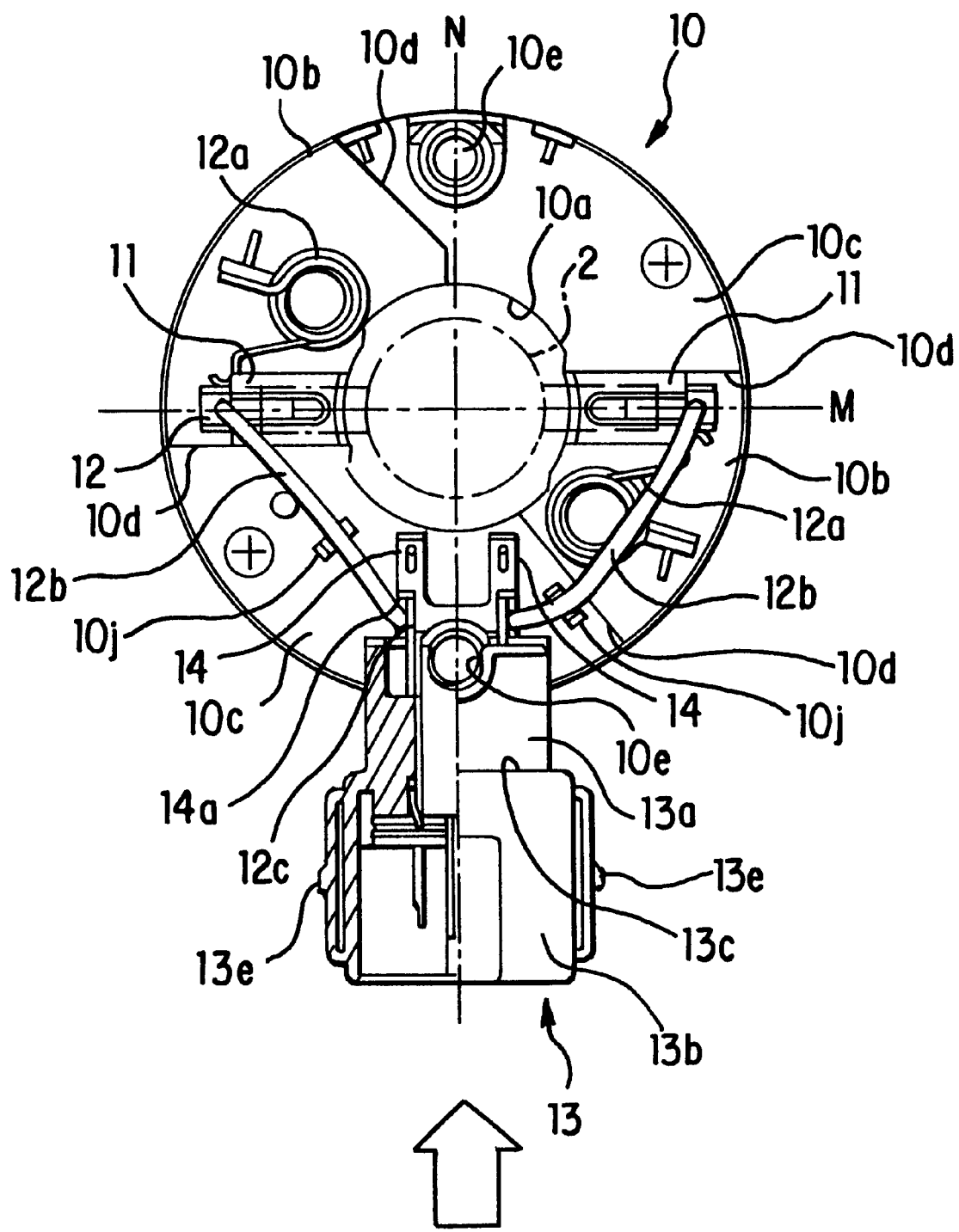
FIG. 3 is a front elevation view of a base unit according to an embodiment of the invention, showing a connected condition of a coupler unit.
Figure 4:
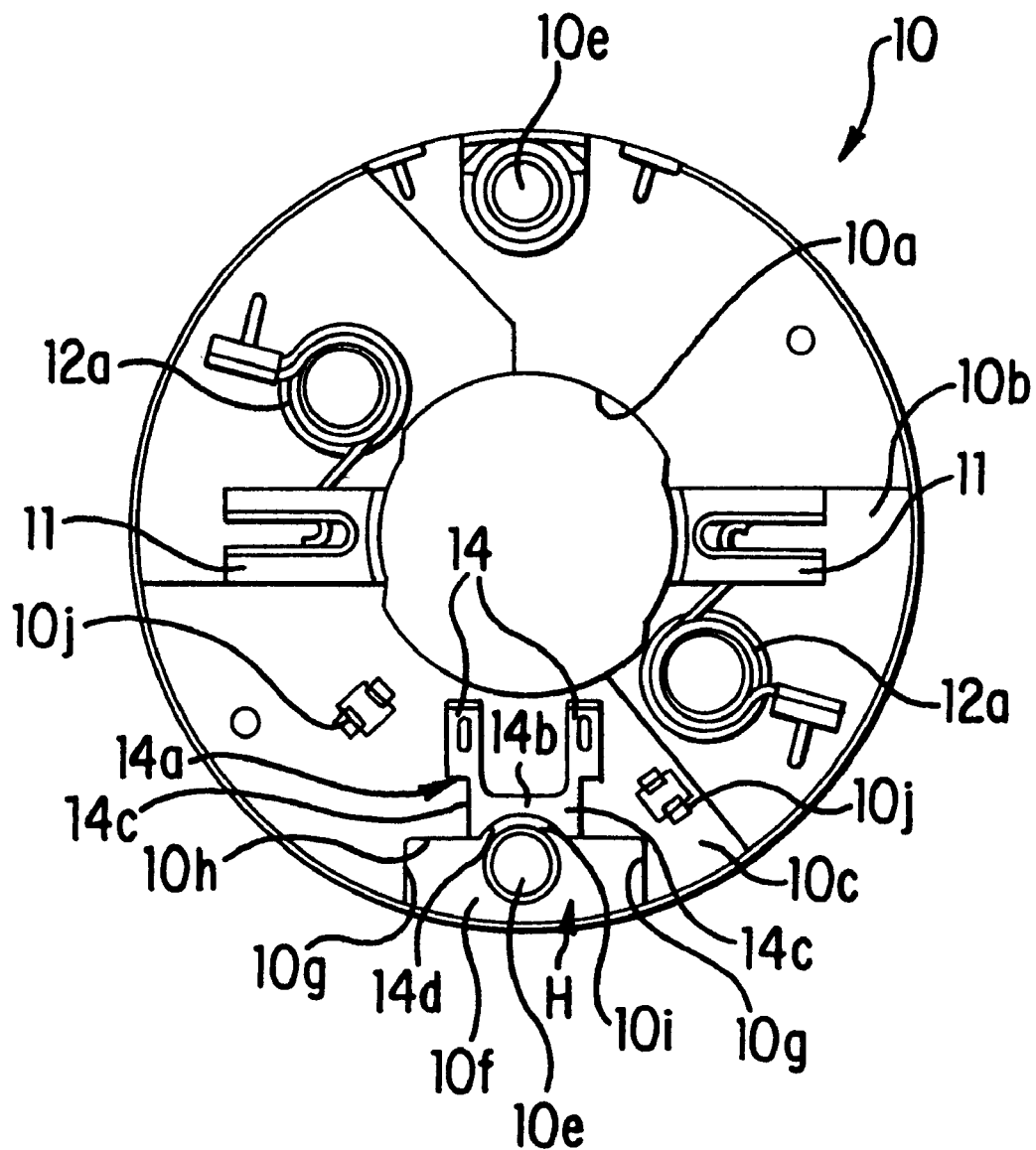
FIG. 4 is a front elevation view showing the base unit according to an embodiment of the invention.
Figure 5:
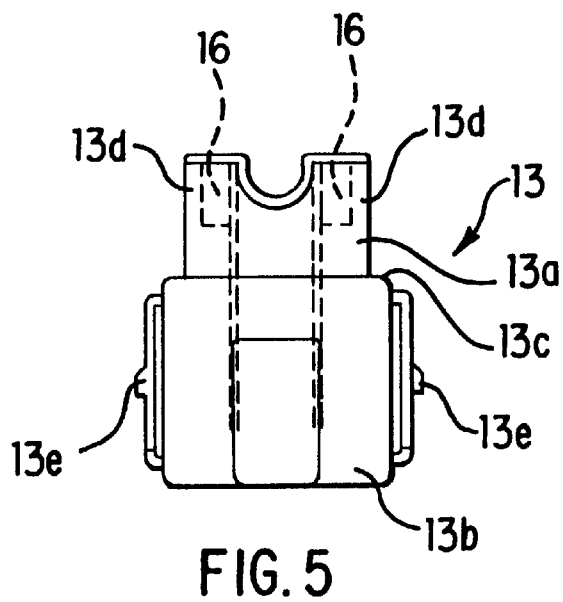
FIG. 5 is a front elevation view showing the coupler unit according to an embodiment of the invention.
Figure 6:
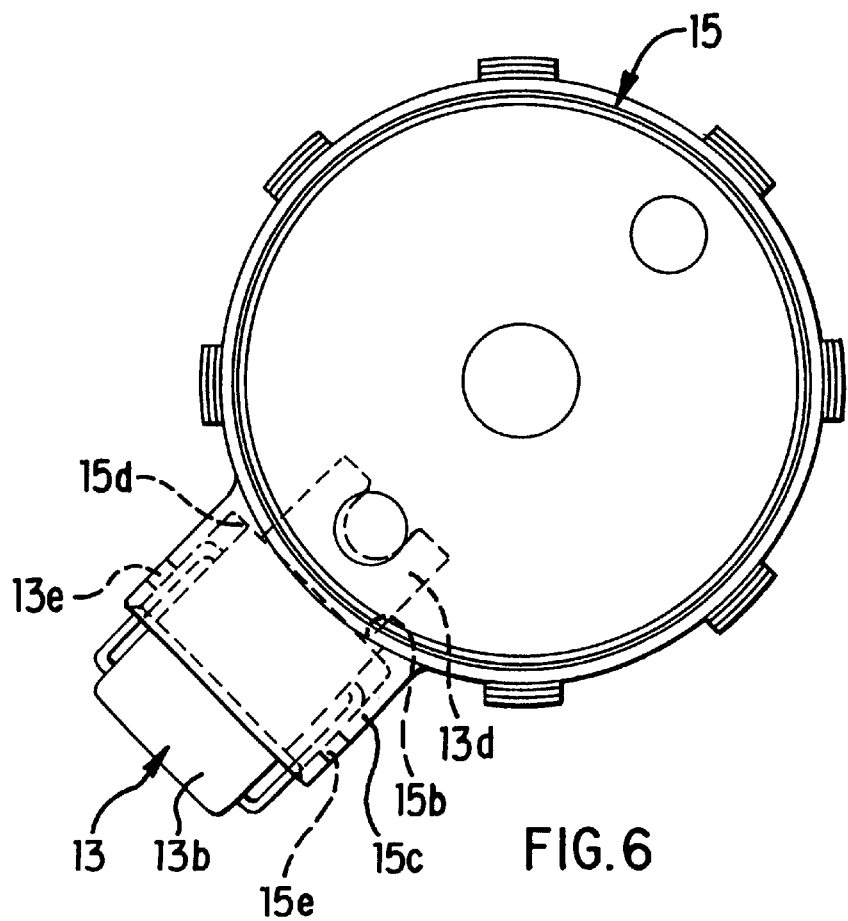
FIG. 6 is a front elevation view showing a state where the coupler unit is inserted into a water-proof cover.
Figure 7:
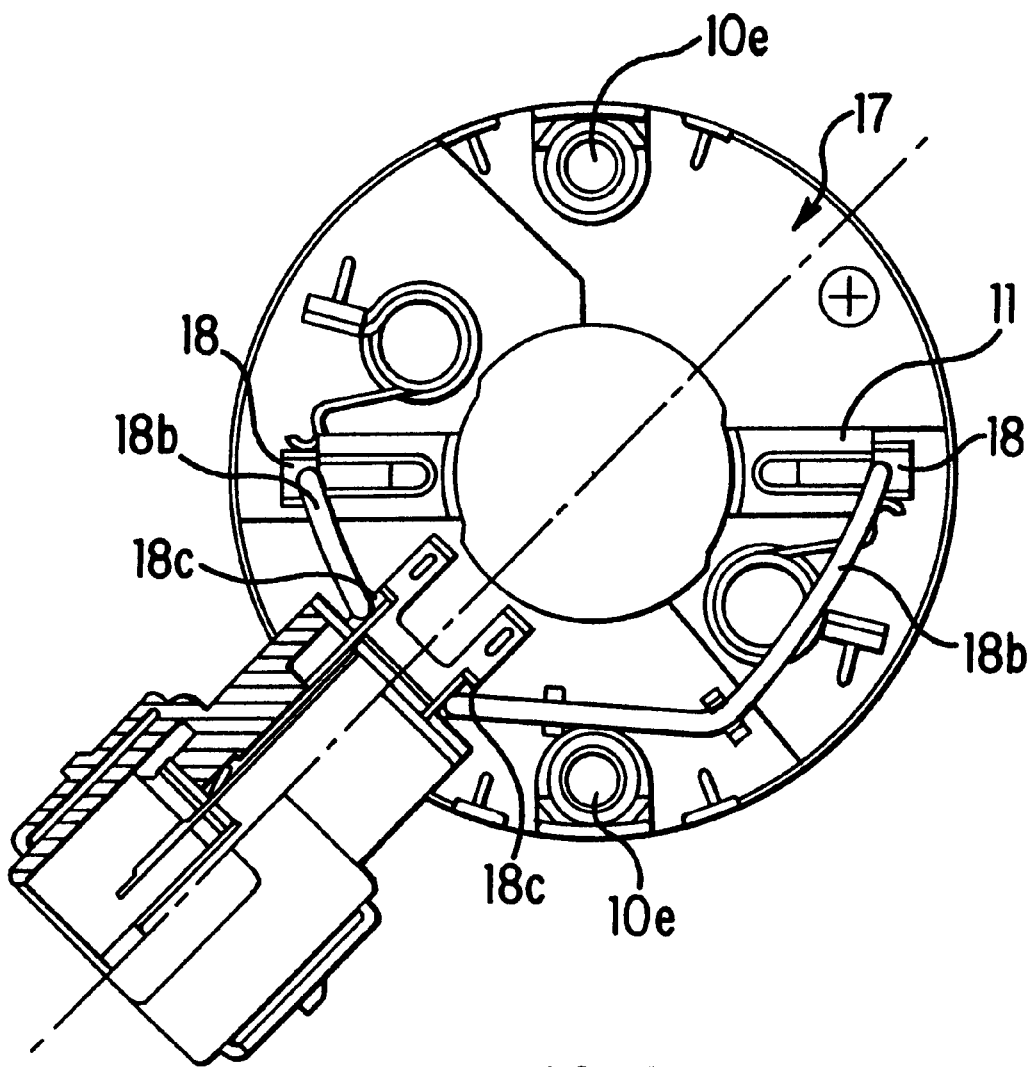
FIG. 7 is a front elevation view of a conventional base unit, showing a connected condition of internal terminal plates to a coupler unit.

An embodiment of the present invention will be described hereafter with reference to FIGS. 1 to 6.

In the illustrations, numeral 1 represents an electric motor for an anti-lock brake system. In the electric motor 1, an armature core 3 rotating integrally with an armature shaft 2 is placed within a yoke 5 in which a permanent magnet 4 is fixedly secured onto the inner circumferential surface of yoke 5. An eccentric output shaft section 2a is formed at the tip portion of the armature shaft 2, and a piston rod for the brake system is connected to the eccentric output shaft section 2a. These structures are similar to those known in the art.

The yoke 5 has a closed bottom can-type configuration, and a small-diameter cylindrical section 5a is formed on the bottom surface to protrude toward the outside. A proximal portion of the armature shaft 2 is rotatably supported in the small diameter section through a bearing 6. Numeral 7 designates a pump bracket that is incorporated to be in a contacting condition to cover the open axial end of the yoke 5. The pump bracket 7 has a box-like configuration in which an inner cylindrical section 7a is formed at its central portion, and the tip portion of the armature shaft 2 is rotatably supported through a bearing 8 within the inner cylindrical section 7a.

The open axial end of the yoke 5 is abutted against a proximal end surface of the pump bracket 7 to seal it off and the yoke and the bracket are connected through a pair of set bolts 9 inserted from the closed bottom surface end of the yoke 5, so that the electric motor 1 is connected to the pump bracket 7.

The connection between the eccentric output shaft section 2a at the tip portion of the armature shaft 2 and the piston rod for the brake system is made within the cylindrical section 7a of the pump bracket 7.

A base unit 10 is incorporated into the open axial end of the yoke 5 such that an axial end surface of the base unit 10 is coincident with the proximal end surface of the pump bracket 7, and a commutator 2b set at the tip portion of the armature shaft 2 penetrates a shaft through hole 10a made in a central portion of the base unit 10. Base unit 10 is integrally formed to have a generally disc-like configuration, and is made such that first surface sections 10b come into contact with the proximal surface of the pump bracket 7 and second surface sections 10c protruding more toward the closed bottom side of the yoke than the first surface sections 10b are alternately disposed in the circumferential direction in a state where step surface sections 10d are interposed therebetween. A pair of brush holders 11 are provided extending radially outward from armature shaft 2 and slidably supporting brushes for movement toward and away from the commutator 2b. The brush holders 11 are supported on surface sections 10b of base unit 10, and a brush 12 can be moved out of a brush holder 11 into contact with the commutator 2b, or back into brush holder 11 and out of contact with the commutator 2b. The pair of brush holders 11 are disposed so that the center lines M of the brushes 12 in the directions of movement toward and away from commutator 2b lie on the same diameter line. Numeral 12a denotes a coil-like elastic member for biasing a brush 12 so that the tip portion of the brush 12 is brought into sliding contact with the commutator 2b and pressed against the commutator.

A pair of set bolt through holes 10e, through which the set bolts 9 penetrate, are made in the outer diameter sides of the second surface sections 10c of the base unit 10. Set bolt through holes 10e are disposed so that a virtual line N connecting the centers of holes 10e passes through the axis of the base unit 10 and is substantially normal to the center line M in the direction of movement of brushes 12 toward and away from commutator 2b.

One of the second surface sections 10c is formed integrally with a recessed coupler supporting groove H having a bottom surface section 10f in the same axial plane as the first surface section 10b and located at the position of the formation of a set bolt through hole 10e, with the set bolt through hole 10e being made in the bottom surface section 10f. The coupler supporting groove H is formed with substantially a square shape so as to receive the insertion of a tip portion of a coupler unit 13 which will be described herein later. The coupler supporting groove H comprises the aforesaid bottom surface section 10f, side surface sections 10 g located on both sides of the set bolt through hole 10e in the circumferential direction and an inner diameter side surface section 10h. The coupler supporting groove H is open in a radially outward direction. In addition, the inner-diameter side surface section 10h of the coupler supporting groove H is formed to slightly overlap with an upper portion of the set bolt through hole 10e. Accordingly, an arc surface 10i for guiding the set bolt 9 is formed on the inner-diameter side surface 10h; of coupler supporting groove H.

Furthermore, numeral 14 denotes a pair of terminal holders located between the coupler supporting groove H of the second surface section 10c and the armature shaft through hole 10a and formed to protrude toward the closed bottom side of the yoke 5 and the bracket 7. Each of these terminal holders 14 is provided with a terminal holding section 14a formed to be open toward the outer-diameter side, which houses and supports an inner-diameter side half section of an internal terminal plate 12c to which the pigtail 12b drawn out from each of the brushes 12 is connected through a means such as soldering. In this case, outer-diameter side half sections of the pair of internal terminal plates 12c extend from terminal holding section 14a to the outer-diameter side and protrude into the coupler supporting groove H. In this state, the internal terminal plates 12c are disposed in facing relationship on both sides of the outer circumference of a set bolt 9 with a slight separation between each of the internal terminals and the set bolt 9 such that the internal terminals straddle the outer circumference of set bolt 9, and the tip portions of the internal terminals extend to the outer-diameter side of the bottom surface section 10f.

Numeral 14b depicts a connecting section between both the terminal holders 14. The connecting section 14b is contiguous with terminal guide surfaces 14c at both ends of the connecting section 14b. Terminal guide surfaces 14c guide each internal terminal plate 12c from the outer-diameter side end portion of the terminal holding section 14a to the coupler supporting groove H. The outer-diameter side surface of connecting section 14b is connected with the inner-diameter side surface section 10h of the coupler supporting groove H, and the bolt guide surface section 14d including the arc surface 10i guides the inner-diameter side portion of the set bolt 9.

Each of the brushes 12 is incorporated as one assembly including the pigtail 12b and the internal terminal plate 12c, and in this case, the respective brushes 12 can connect with pigtails 12b having substantially the same length. Therefore, the pair of brushes 12 are produced as substantially identical assemblies, allowing manufacturing efficiencies and interchangeability of parts. The pigtail 12b is drawn around between the brush 12 and the terminal holder 14 and guided by each of guide pieces 10j formed on the base unit 10.

Numeral 15 designates a resin-made water-proof cover for covering the yoke 5. Water-proof cover 15 has a closed bottom cylindrical configuration, and an end edge section 15a, together with a yoke 5 end edge section, is made to be fitted to the proximal surface of the pump bracket 7 in a sealing relationship.

Substantially square through holes 5b, 15b are respectively formed in the cylindrical sections of the yoke 5 and the water-proof cover 15 in alignment with each other and in an opposed relation to the aforesaid terminal holders 14. A square, box-like locking tube 15c is formed integrally with the cylindrical section of the waterproof cover 15, and in communication with the through hole 15b. Locking tube 15c is set to have an outer diameter greater than that of the through hole 15b, and is formed to protrude outwardly from waterproof cover 15.

The coupler unit 13 is inserted into the coupler supporting groove H made in the base unit 10 such that an inserting tip portion passes through hole 5b of the yoke 5 and through hole 15b of the water-proof cover 15. Coupler unit 13 includes a square smaller tube section 13a on the inserting tip side and a larger tube section 13b fitted and supported in the locking tube 15c, with the smaller tube section 13a and the larger tube section 13b being integrally formed with each other through a stepped surface section 13c. The inserting tip portion of the small tube section 13a is bifurcated to form rectangular tube-like external terminal supporting sections 13d. A pair of external terminal plates 16 for electrically connecting with the internal terminal plates 12c are respectively fitted and supported in terminal supporting sections 13d. The bifurcated branch section formed between the terminal supporting sections 13d is made to have a generally U-like configuration, and the branch section is made to straddle the outer circumference of set bolt 9 where set bolt 9 penetrates the base unit 10 when the coupler unit 13 is inserted through holes 5b and 15b and set into the base unit 10 side of the yoke as will be described below.

The coupler unit 13 is abutted against the respective through holes 5b, 15b on the smaller tube section 13a side and the internal terminal plate 12c is fitted and pushed in the coupler terminal supporting section 13d so that the inserting tip portion of the coupler small tube section 13a is inserted into the coupler supporting groove H. The coupler unit 13 is inserted into groove H with the tip surface of the coupler terminal supporting section 13d contacting the inner-diameter side surface section 10h of the coupler supporting groove H and the outer-diameter side end portion of the terminal guide surface 14c of the terminal holder 14, thereby establishing the connection between the coupler unit 13 and the internal terminal plates 12c. In this inserted condition, the exposed portion of the internal terminal plate 12c protruding toward the coupler supporting groove H is fitted in the coupler terminal supporting section 13d, and therefore, the portion of the internal terminal plate in opposed relation to the set bolt 9 is insulated from set bolt 9 by the coupler inserting tip portion. Electricity-supplying lead lines (not shown) are connected to the external side of the coupler unit 13 thus set, thereby supplying electricity to the brushes 12.

In the inserted condition, the step section 13c between the smaller tube section 13a and the larger tube section 13b of the coupler unit 13 runs against the step section 15d formed between the locking tube 15c and the through hole 15b of the water-proof cover 15. In this set condition, the coupler unit 13 and the water-proof cover 15 are engaged with each other to prevent undesired separation by locking claws 13e formed on a pair of facing side surfaces of the larger tube section 13b that are engaged with locking holes 15e formed on the locking tube 15c. Thus, the coupler unit 13 is prevented from dropping out from the water-proof cover 15.

In the above-described embodiment of this invention, the electric motor 1 is connected to the internal terminal plates 12c placed on the base unit 10 in a manner such that the coupler unit 13 having the external terminal plates 16 is inserted through the through holes 5b, 15b of the yoke 5 and the water-proof cover 15. The connecting portions between the pair of internal terminal plates 12c and the coupler unit 13 are made so that the set bolt 9 penetrating the yoke 5 in the axial direction passes between the bifurcated inserting tip portions of the coupler unit 13. As a result, the distances between each of the internal terminal plates 12c and the respective connected brushes 12 are substantially the same, and therefore, the same unit can be used and assembled without the need for preparation of different brushes, which can contribute to a reduced number of parts and an improved efficiency of assembly.

The insulation between the set bolt 9 and the internal terminal plates 12c is accomplished by the inner side surfaces of the rectangular tube-like terminal supporting sections 13d of the coupler unit 13 formed to straddle the outer circumference of set bolt 9, with the result that insulation with respect to the set bolt 9 is achievable without using a special member.

The connection between the coupler unit 13 penetrating the yoke 5 and the internal terminal plates 12c is made with a simple inserting operation and with an interlocking relationship that prevents undesired separation, thus providing easy assembly and simplified operations. Since the coupler unit 13 is designed so that the bifurcated inserting tip portions straddle the outer circumference of set bolt 9, in the case that a load occurs on the coupler in a circumferential direction or perpendicular to set bolt 9, that load is mainly received by the set bolt 9. Therefore, such external loads will not act on the terminal holder 14 holding the internal terminal plates 12c on the base unit 10 side, which can prevent the looseness of the coupler unit 13 in the circumferential directions.

The coupler unit 13 is made to be inserted through the tube sections of the yoke 5 and the water-proof cover 15, and the supporting section for preventing the coupler unit 13 from falling out at this time is the locking tube 15c. Therefore, an axial external load applied to the coupler unit 13 is received by the water-proof cover 15, but not by the base unit 10 equipped with the brush holder 11. A large load is thereby prevented from working on the base unit 10, which can eliminate the need for particularly enhancing the strength of the base unit 10, thus contributing to a smaller-sized electric motor.

It should be understood that the foregoing relates to only a preferred embodiment of the present invention, and that it is intended to cover all changes and modifications of the embodiment of the invention herein used for the purpose of the disclosure, which do not constitute departures from the spirit and scope of the claimed invention.

What is claimed is:

1. An electric motor, comprising;
    a yoke, said yoke incorporating an armature shaft extending substantially parallel to a central axis of said yoke;
    a set bolt extending through said yoke substantially parallel to said central axis for connecting said yoke to a bracket;
    a base unit extending across one axial end of said yoke and being penetrated by said set bolt, said base unit supporting a pair of brush holders and a pair of internal terminals;
    brushes within said pair of brush holders being connected to said pair of internal terminals, and said pair of internal terminals straddling the outer circumference of said set bolt; and
    a coupler unit, said coupler unit having external terminals for electrical connection to said pair of internal terminals, said external terminals being positioned within a bifurcated branch section at an inserting tip portion of said coupler unit, said bifurcated branch section straddling the outer circumference of said set bolt when said coupler unit is connected to said yoke.

2. The electric motor according to claim 1, wherein portions of said bifurcated branch section of said coupler unit provide insulation between said set bolt and said internal terminals when said coupler unit is connected to said yoke.

3. The electric motor according to claim 2, wherein said inserting tip portion of said coupler unit penetrates a hole in said yoke when said coupler unit is connected to said yoke.

4. The electric motor according to claim 1, wherein said brushes are substantially equidistant from internal terminals of said pair of internal terminals to which they are respectively connected.

5. The electric motor according to claim 4, wherein portions of said bifurcated branch section of said coupler unit provide insulation between said set bolt and said internal terminals when said coupler unit is connected to said yoke.

6. The electric motor according to claim 5, wherein said inserting tip portion of said coupler unit penetrates a hole in said yoke when said coupler unit is connected to said yoke.

7. The electric motor according to claim 1, wherein said inserting tip portion of said coupler unit penetrates a hole in said yoke substantially perpendicular to said central axis when said coupler unit is connected to said yoke.

8. The electric motor according to claim 7, wherein said brushes are substantially equidistant from internal terminals of said pair of internal terminals to which they are respectively connected.

* * * * *